United States Patent
Foguenne et al.

(10) Patent No.: US 7,033,967 B2
(45) Date of Patent: Apr. 25, 2006

(54) SODA-LIME GLASS OF BLUE HUE

(75) Inventors: Marc Foguenne, Saint-Denis (BE); Dominique Coster, Temploux (BE)

(73) Assignee: Glaverbel, Brussels (BE)

( * ) Notice: Subject to any disclaimer, the term of this patent is extended or adjusted under 35 U.S.C. 154(b) by 181 days.

(21) Appl. No.: 10/771,524

(22) Filed: Feb. 5, 2004

(65) Prior Publication Data

US 2004/0157721 A1     Aug. 12, 2004

Related U.S. Application Data

(63) Continuation of application No. 09/868,847, filed as application No. PCT/EP99/09849 on Dec. 13, 1999, now abandoned.

(30) Foreign Application Priority Data

Dec. 22, 1998   (EP) ................................. 98124371

(51) Int. Cl.
  *C03C 3/087*   (2006.01)
  *C03C 4/10*    (2006.01)
(52) U.S. Cl. .......................... 501/70; 501/71; 501/904; 501/905
(58) Field of Classification Search ................. 501/64, 501/70, 71, 904, 905
   See application file for complete search history.

(56) References Cited

U.S. PATENT DOCUMENTS

| 5,352,640 A | 10/1994 | Combes et al. |
| 5,393,593 A | 2/1995  | Gulotta et al. |
| 5,411,922 A | 5/1995  | Jones |

FOREIGN PATENT DOCUMENTS

JP    10-114540    5/1998

OTHER PUBLICATIONS

Seto et al., Derwent abstract and machine translation of JP 10-114540.

*Primary Examiner*—Karl Group
*Assistant Examiner*—Elizabeth A. Bolden
(74) *Attorney, Agent, or Firm*—Akerman Senterfitt

(57) ABSTRACT

The invention relates to a coloured soda-lime glass of blue hue, containing more than 2 wt. % of MgO, more than 1.1 wt. % of $Fe_2O_3$, less than 0.53 wt. % of FeO and less than 0.13 wt. % of $MnO_2$, and presenting under Illuminant A and for a glass thickness of 4 mm, a transmission factor (TLA4) higher than 15%, a selectivity (SE4) higher than 1.2 and a dominant wavelength ($\lambda_D$) and a purity of excitation (P) such that they are located in the CIE chromaticity co-ordinate diagram inside a triangle whereof the apices are defined by the point representing the illuminant source C and the points whereof the co-ordinates ($\lambda_D$, P) are (490,19) and (476,49) respectively. Said glass is particularly suitable for motor vehicle side windows, rear windows and sun roof.

10 Claims, No Drawings

SODA-LIME GLASS OF BLUE HUE

This application is a Continuation of U.S. patent application Ser. No. 09/868,847, filed Oct. 11, 2001, now abandoned which is a 371 of PCT/EP99/09849 filed on Dec. 13, 1999.

The present invention relates to a colored soda-lime glass of blue hue, composed of glass-forming main constituents and of coloring agents.

The expression "soda-lime glass" is used here in the wide sense and relates to any glass which contains the following constituents (in percentages by weight):

| | |
|---|---|
| Na$_2$O | 10 to 20% |
| CaO | 0 to 16% |
| SiO$_2$ | 60 to 75% |
| K$_2$O | 0 to 10% |
| MgO | 0 to 10% |
| Al$_2$O$_3$ | 0 to 5% |
| BaO | 0 to 2% |
| BaO + CaO + MgO | 10 to 20% |
| K$_2$O + Na$_2$O | 10 to 20%. |

This type of glass is very widely used in the field of glazing for buildings or automobiles, for example. It is usually manufactured in the form of a ribbon by the float process. Such a ribbon can be cut into sheets which can then be bent or can undergo a treatment to improve their mechanical properties, for example a thermal toughening step.

It is generally necessary to relate the optical properties of a glass sheet to a standard illuminant. In the present description, 2 standard illuminants are used, namely illuminant C and illuminant A defined by the Commission Internationale de l'Eclairage (C.I.E.). Illuminant C represents average daylight having a color temperature of 6700 K. This illuminant is especially useful for evaluating the optical properties of glazing intended for buildings. Illuminant A represents the radiation of a Planck radiator with a temperature of about 2856 K This illuminant describes the light emitted by car headlights and is essentially intended to evaluate the optical properties of windows intended for automobiles. The Commission Internationale de l'Eclairage has also published a document entitled "Colorimétrie, Recommandations Officielles de la C.I.E. [*Colorimetry and Official Recommendations of the C.I.E.*]" (May 1970) which describes a theory in which the colorimetric coordinates for light of each wavelength of the visible spectrum are defined so as to be able to be represented on a diagram having orthogonal axes x and y, called the C.I.E. 1931 chromaticity plot. This chromaticity plot shows the locus representative of light of each wavelength (expressed in nanometers) of the visible spectrum. This locus is called the "spectrum locus" and light whose coordinates lie on this spectrum locus is said to have 100% excitation purity for the appropriate wavelength. The spectrum locus is closed by a line called the purple boundary which connects the points of the spectrum locus whose coordinates correspond to wavelengths of 380 nm (violet) and 780 nm (red). The area lying between the spectrum locus and the purple boundary is that available for the chromaticity coordinates of any visible light. The coordinates of the light emitted by illuminant C, for example, correspond to x=0.3101 and y=0.3162. This point C is regarded as representing white light and consequently has an excitation purity equal to zero for any wavelength. Lines may be drawn from the point C to the spectrum locus at any desired wavelength and any point lying on these lines may be defined not only by its x and y coordinates but also as a function of the wavelength corresponding to the line on which it lies and on its distance from the point C relative to the total length of the wavelength line. Consequently, the color of the light transmitted by a colored glass sheet may be described by its dominant wavelength and its excitation purity expressed as a percentage.

The C.I.E. coordinates of light transmitted by a colored glass sheet will depend not only on the composition of the glass but also on its thickness. In the present description, and in the claims, all the values of the excitation purity P and of the dominant wavelength $\lambda_D$ of the transmitted light are calculated from the spectral specific internal transmissions (SIT$_\lambda$) of a glass sheet 5 mm in thickness. The spectral specific internal transmission of a glass sheet is governed solely by the absorption of the glass and can be expressed by the Beer-Lambert law:

SIT$_\lambda$=e$^{-E.A_\lambda}$ where A$_\lambda$ is the absorption coefficient (in cm$^{-1}$) of the glass at the wavelength in question and E is the thickness (in cm) of the glass. To a first approximation, SIT$_\lambda$ may also be represented by the formula:

$$(I_3+R_2)/(I_1-R_1)$$

where I$_1$ is the intensity of the visible light incident on a first face of the glass sheet, R$_1$ is the intensity of the visible light reflected by this face, I$_3$ is the intensity of the visible light transmitted from the second face of the glass sheet and R$_2$ is the intensity of the visible light reflected by this second face toward the interior of the sheet.

In the description which follows and in the claims, the following are also used:

for illuminant A, the total light transmission (TLA) measured for a thickness of 4 mm (TLA4). This total transmission is the result of the integration between the 380 and 780 nm wavelengths of the expression: $\Sigma T_\lambda.E_\lambda.S_\lambda/\Sigma E_\lambda.S_\lambda$ in which $T_\lambda$ is the transmission at the wavelength $\lambda$, $E_\lambda$ is the spectral distribution of illuminant A and $S_\lambda$ is the sensitivity of the normal human eye as a function of the wavelength $\lambda$;

the total energy transmission (TE) measured for a thickness of 4 mm (TE4). This total transmission is the result of the integration between the 300 and 2500 nm wavelengths of the expression: $\Sigma T_\lambda.E_\lambda/\Sigma E_\lambda$ in which $E_\lambda$ is the spectral energy distribution of the sun at 30° above the horizon;

the selectivity (SE) measured as the ratio of the total light transmission for illuminant A to the total energy transmission (TLA/TE);

the total transmission in the ultraviolet, measured for a thickness of 4 mm (TUV4). This total transmission is the result of the integration between 280 and 380 nm of the expression: $\Sigma T_\lambda.U_\lambda/\Sigma U_\lambda$ in which $U_\lambda$ is the spectral distribution of the ultraviolet radiation that has passed through the atmosphere, defined in the DIN 67507 standard.

The present invention relates in particular to selective glasses of blue hue. These glasses may be used in architectural applications and as windows for railway carriages and motor vehicles. In architectural applications, glass sheets 4 to 6 mm in thickness are generally used, whereas in the automobile field thicknesses of 1 to 5 mm are commonly employed, in particular for the production of side windows and sunroofs.

The invention consists of a colored soda-lime glass of blue hue composed of glass-forming main constituents, including more than 2% of magnesium oxide and coloring agents, characterized in that it contains more than 1.1 wt % $Fe_2O_3$, less than 0.53 wt % FeO and less than 0.13 wt % manganese oxide, has a light transmission (TLA4) of between 15% and 70% and a selectivity (SE4) of greater than 1.2 and has a dominant wavelength ($\lambda_D$) and an excitation purity (P) such that they lie in a CIE 1931 chromaticity plot within a triangle whose apices are defined by the point representing the illuminant C source and the points whose coordinates ($\lambda_D$, P) are (490,19) and (476,49), respectively.

The combination of these optical properties is particularly advantageous in that it offers a particularly esthetic color hue, while ensuring sufficient light transmission through the glass and a high selectivity which makes it possible to limit the internal heating of the volumes bounded by windows according to the invention.

It is desirable for the main constituents which form the glass according to the invention to comprise an MgO concentration of greater than 2% since this compound favors the fusion of said constituents.

As regards iron, this is present in most commercially available glasses either as an impurity or introduced deliberately as a coloring agent. The presence of $Fe^{3+}$ gives the glass a slight absorption of visible light of short wavelength (410 and 440 nm) and a very strong absorption band in the ultraviolet (absorption band centered on 380 nm), whereas the presence of $Fe^{2+}$ ions causes a strong absorption in the infrared (absorption band centered on 1050 nm). Consequently, as the $Fe^{2+}$ concentration increases, the TE value decreases, thereby increasing the SE value. Moreover, the ferric ions give the glass a slight yellow coloration, whereas the ferrous ions give a more pronounced blue-green coloration. The high $Fe_2O_3$ content of the glass according to the invention therefore makes it very impervious to ultraviolet radiation and its low FeO content means that the glass can be produced by means of a conventional furnace, which may be of large capacity since its limited absorption of infrared radiation is not an obstacle to the diffusion of heat in such a furnace. Now, it is more economic to use this type of furnace than the small electric furnaces normally used in the manufacture of highly selective glasses. In such cases in fact, the high FeO contents make the glass difficult to melt, and usually require the use of low-capacity electric furnaces.

With the purpose of obtaining a high selectivity, the glass according to the invention also contains less than 0.13% $MnO_2$ as this agent, owing to its oxidizing role, is unfavorable to selectivity.

Preferably, the colored glass according to the invention has a dominant wavelength ($\lambda_D$) and an excitation purity (P) such that they lie in a CIE 1931 chromaticity plot within a triangle whose apices are defined by the point representing the illuminant C source and the points whose coordinates (($\lambda_D$, P) are (490,19) and (480,38), respectively. This corresponds to colorations considered to be particularly attractive.

Even more preferably, the glass according to the invention has a dominant wavelength of less than 489 nm and/or a purity of greater than 12%, which corresponds to particularly desirable colors.

Also preferably, the glass according to the invention has a TUV4 of less than 10%. Such a value makes it possible to avoid any discoloration of objects lying within a volume bounded by a surface glazed by glass according to the invention. This property is particularly advantageous in the automobile sector. A low ultraviolet transmission in fact prevents aging and discoloration of vehicle interior linings constantly exposed to the action of sunlight.

It is desirable for the glass according to the invention to have a redox value ($Fe^{2+}/Fe_{total}$) of less than 41%. Such values make the glass particularly easy to melt in conventional glass furnaces.

Preferably, the glass according to the invention contains, as coloring agent, at least one of the elements chromium, cobalt, cerium, titanium, selenium and vanadium. The use of these elements makes it possible to adjust the optical properties of the glass in an optimum fashion and contributes to obtaining a highly selective glass.

It is possible to produce a glass having a color similar to that of the glass according to the invention using nickel as the main coloring agent. However, the presence of nickel has drawbacks, especially when the glass must be produced by the float process. In this process, a ribbon of hot glass is conveyed along the surface of a bath of molten tin so that its faces are plane and parallel. In order to prevent the oxidation of the tin present on the surface of the bath, which would lead to tin oxide being entrained by the ribbon, a reducing atmosphere is maintained above the bath. When the glass contains nickel, the latter is partially reduced by this atmosphere, which gives rise to a haze in the glass produced. This element is also inconducive to obtaining a high selectivity value of the glass which contains it, since it does not absorb light in the infrared range, resulting in a high TE value. In addition, nickel present in the glass can give rise to the formation of NiS. This sulfide exists in various crystalline forms which are stable in different temperature ranges, and the transformations of which, from one form to another, are damaging when the glass is reinforced by a thermal toughening treatment, as is the case in the automobile field and in the case of certain architectural applications (balconies, curtain walling, etc.). Consequently, the glass according to the invention contains no nickel.

The effects of the various coloring agents individually envisioned for producing a glass are the following (according to "Le Verre [*Glass*]" by H. Scholze, translated by J. Le Dû, Institut du Verre [*Glass* Institute], Paris):

cobalt: the $Co^{II}O_4$ group produces an intense blue coloration whose dominant wavelength is virtually the opposite of that produced by the iron-selenium chromophore;

chromium: the presence of the $Cr^{III}O_6$ group gives rise to absorption bands at 650 nm and a light green color. More extensive oxidation gives rise to the $Cr^{VI}O_4$ group which creates a very intense absorption band at 365 nm and gives a yellow coloration;

cerium: the presence of cerium ions in the composition makes it possible to obtain a strong absorption in the ultraviolet range. Cerium oxide exists in two forms: $Ce^{IV}$ absorbs in the ultraviolet around 240 nm and $Ce^{III}$ absorbs in the ultraviolet around 314 nm;

selenium: the $Se^{4+}$ cation has virtually no coloring effect, whereas the uncharged element SeO gives a pink coloration. The $Se^{2-}$ anion forms a chromophore with the ferric ions present and consequently gives the glass a red-brown color;

vanadium: for increasing contents of alkali metal oxides, the color changes from green to colorless, this being caused by the oxidation of the $V^{III}O_6$ group into $V^VO_4$;

manganese: appears in the glass in the form of $Mn^{II}O_6$ which is virtually colorless. Glasses rich in alkali metals have, however, a violet color because of the $Mn^{III}O_6$ group;

titanium: the $TiO_2$ in the glasses gives them a yellow coloration. For large amounts it is possible to obtain, by reduction, the $Ti^{III}O_6$ group which colors in the violet or even brown.

The thermal and optical properties of a glass containing several coloring agents are therefore the result of a complex interaction between them. In fact, the behavior of these coloring agents depends greatly on their redox state and therefore on the presence of other elements liable to influence this state.

Preferably, the glass according to the invention has a selectivity (SE4) of greater than 1.6. It is particularly remarkable to obtain a glass presenting such a high selectivity although it has a low upper limit of the FeO content by weight.

A glass according to the invention may comprise the following percentages by weight of coloring agents, the total amount of iron being expressed in the form of $Fe_2O_3$:

| | |
|---|---|
| $Fe_2O_3$ | 1.2 to 1.6% |
| FeO | 0.34 to 0.50% |
| Co | 0.0030 to 0.0100% |
| $Cr_2O_3$ | 0 to 0.0200% |
| $V_2O_5$ | 0 to 0.0500% |
| Se | 0 to 0.0020% |
| $CeO_2$ | 0 to 0.5% |
| $TiO_2$ | 0 to 1.5%. |

The elements cerium and vanadium are both favorable to obtaining the low ultraviolet and infrared transmission value of the glass according to the invention. As to the use of chromium and cerium, this is not unfavorable to the preservation of the refractory walls of the glassmaking furnace with respect to which these elements present no risk of corrosion.

However, the number of colorants present in such a glass is preferably limited so as to make it easier to produce it. In particular, it may be advantageous to avoid the use of selenium, which is expensive and is inefficiently incorporated into the glass.

Consequently, this glass may preferably comprise the following percentages by weight of coloring agents, the total amount of iron being expressed in the form of $Fe_2O_3$:

| | |
|---|---|
| $Fe_2O_3$ | 1.2 to 1.5% |
| FeO | 0.34 to 0.45% |
| Co | 0.0030 to 0.0100% |
| $Cr_2O_3$ | 0 to 0.0150% |
| $V_2O_5$ | 0 to 0.0400%. |

The following optical properties are associated with these compositions:

35%<TLA4<45%

20%<TE4<30%

TUV4<9%

$\lambda_D$>483 nm

P>12%.

The light transmission range thus defined makes the glass according to the invention particularly useful for avoiding the dazzling effect produced by the light from automobile headlights when it is used for the rear side windows or as the rear window of vehicles. As for the corresponding energy transmission range this gives the glass its high selectivity.

A glass which has the above optical properties is particularly appropriate as a rear side window and a rear window of automotive vehicles.

Another glass according to the invention can comprise the following percentages by weight of coloring agents, the total amount of iron being expressed in the form of $Fe_2O_3$:

| | |
|---|---|
| $Fe_2O_3$ | 1.3 to 1.8% |
| FeO | 0.30 to 0.50% |
| Co | 0.0160 to 0.0270% |
| $Cr_2O_3$ | 0 to 0.0200% |
| $V_2O_5$ | 0 to 0.0500% |
| Se | 0 to 0.0040% |
| $CeO_2$ | 0 to 0.5% |

The following optical properties are associated with these composition ranges:

16%<TLA4<24%

12%<TE4<18%

TUV4<5%

476 nm<$\lambda_D$<483 nm

P>18%.

Such glasses are particularly suitable for the production of sunroofs of automotive vehicles.

The glass according to the invention may be coated with a layer of metal oxides which reduce its heating by solar radiation and consequently that of the passenger compartment of a vehicle using such a glass as glazing.

The glasses according to the present invention may be manufactured by conventional processes. In terms of batch materials, it is possible to use natural materials, recycled glass, scoria or a combination of these materials. The colorants are not necessarily added in the form indicated, but this manner of giving the amounts of coloring agents added, in equivalents in the forms indicated, corresponds to standard practice. In practice, the iron is added in the form of red iron oxide, the cobalt is added in the form of hydrated sulfate, such as $CoSO_4.7H_2O$ or $CoSO_4.6H_2O$, and the chromium is added in the form of dichromate, such as $K_2Cr_2O_7$. The cerium is introduced in the form of oxide or carbonate. As regards vanadium, it is introduced in the form of oxide or sodium vanadate. The selenium, when present, is added in elemental form or in the form of selenite, such as $Na_2SeO_3$ or $ZnSeO_3$.

Other elements are sometimes present as impurities in the batch materials used for manufacturing the glass according to the invention whether in the natural materials, in the recycled glass or in the scoria, but when these impurities do not give the glass properties which lie outside the limits defined above, these glasses are regarded as being in accordance with the present invention. The present invention will be illustrated by the following specific examples of optical properties and compositions.

EXAMPLES 1 to 88

Table I gives, by way of non-limiting indication, the base composition of the glass and the constituents of the glass batch to be melted in order to produce the glasses according to the invention. Tables IIa, IIb, IIc and IId give the optical properties and the proportions by weight of the coloring agents of a glass containing respectively selenium, cerium, titanium or none of these elements among its coloring agents. These proportions are determined by X-ray fluorescence of the glass and are converted into the molecular species indicated.

The glass mixture may, if necessary, contain a reducing agent, such as coke, graphite or slag, or an oxidizing agent, such as nitrate. In this case, the proportions of the other materials are adapted so that the composition of the glass remains unchanged.

TABLE I

| Composition of the base glass | | Constituents of the base glass | |
|---|---|---|---|
| $SiO_2$ | 71.5 to 71.9% | Sand | 571.3 |
| $Al_2O_3$ | 0.8% | Feldspar | 29.6 |
| CaO | 8.8% | Lime | 35.7 |
| MgO | 4.2% | Dolomite | 167.7 |
| $Na_2O$ | 14.1% | $Na_2CO_3$ | 189.4 |
| $K_2O$ | 0.1% | Sulfate | 5.0 |
| $SO_3$ | 0.05 to 0.45% | | |

TABLE IIa

| ex. No. | $Fe_2O_3$ (%) | FeO (%) | Co (ppm) | $Cr_2O_3$ (ppm) | $V_2O_5$ (ppm) | Se (ppm) | $MnO_2$ (ppm) | TLA4 (%) | TE4 (%) | TUV4 (%) | SE4 | $\lambda_D$ (nm) | P (%) |
|---|---|---|---|---|---|---|---|---|---|---|---|---|---|
| 1 | 1.55 | 0.42 | 100 | traces | 102 | 10 | 50 | 29.47 | 17.62 | 2.99 | 1.67 | 488.89 | 15.13 |
| 2 | 1.65 | 0.45 | 108 | 25 | traces | 5 | 75 | 27.78 | 15.93 | 2.45 | 1.74 | 488.26 | 19.32 |
| 3 | 1.51 | 0.42 | 88 | 15 | 58 | 8 | 100 | 32.04 | 18.55 | 3.44 | 1.72 | 489.59 | 14.90 |
| 4 | 1.62 | 0.43 | 120 | traces | traces | 12 | 50 | 25.27 | 15.73 | 2.51 | 1.60 | 487.5 | 16.84 |
| 5 | 1.39 | 0.47 | 54 | traces | traces | 5 | 100 | 37.32 | 19.12 | 4.87 | 1.95 | 489.94 | 15.62 |
| 6 | 1.42 | 0.49 | 65 | traces | traces | 4 | 150 | 35.19 | 17.84 | 4.70 | 1.97 | 488.54 | 18.60 |
| 7 | 1.40 | 0.32 | 88 | traces | traces | 2 | 200 | 38.78 | 24.33 | 4.15 | 1.59 | 487.09 | 17.59 |
| 8 | 1.72 | 0.49 | 121 | 25 | traces | 14 | 60 | 21.39 | 12.38 | 1.91 | 1.72 | 489.28 | 15.64 |
| 9 | 1.68 | 0.49 | 145 | 25 | 50 | 20 | 80 | 16.61 | 10.91 | 2.06 | 1.52 | 487.28 | 16.40 |
| 10 | 1.44 | 0.38 | 72 | traces | traces | 2 | 90 | 38.40 | 22.18 | 4.04 | 1.73 | 488.94 | 16.27 |
| 11 | 1.39 | 0.45 | 65 | traces | traces | 5 | 75 | 36.55 | 19.51 | 4.80 | 1.87 | 488.72 | 16.93 |
| 12 | 1.41 | 0.39 | 84 | traces | traces | 12 | 150 | 33.84 | 20.33 | 4.31 | 1.66 | 489.15 | 12.65 |
| 13 | 1.81 | 0.47 | 135 | 41 | 10 | 12 | 120 | 19.31 | 11.78 | 1.05 | 1.63 | 489.08 | 17.07 |
| 14 | 1.91 | 0.45 | 146 | 36 | 21 | 2 | 30 | 19.95 | 12.15 | 0.10 | 1.64 | 487.59 | 23.76 |
| 15 | 1.89 | 0.42 | 147 | traces | traces | 8 | 65 | 19.53 | 12.81 | 0.10 | 1.52 | 487.64 | 19.73 |
| 16 | 1.29 | 0.33 | 80 | 17 | 25 | 6 | 45 | 39.42 | 24.69 | 6.88 | 1.59 | 488.06 | 14.97 |
| 17 | 1.27 | 0.45 | 51 | traces | traces | 7 | 60 | 38.42 | 18.71 | 7.70 | 2.05 | 489.79 | 14.49 |
| 18 | 1.15 | 0.31 | 78 | traces | 12 | 12 | 80 | 40.14 | 26.05 | 8.39 | 1.54 | 487.39 | 12.25 |
| 19 | 1.31 | 0.38 | 95 | traces | traces | 8 | 90 | 33.74 | 20.49 | 6.86 | 1.64 | 486.41 | 18.22 |
| 20 | 1.39 | 0.45 | 77 | traces | traces | 3 | 100 | 35.44 | 19.22 | 4.75 | 1.84 | 487.21 | 20.43 |
| 21 | 1.41 | 0.39 | 102 | traces | 15 | 15 | 150 | 30.41 | 19.19 | 4.21 | 1.58 | 487.33 | 13.85 |
| 22 | 1.65 | 0.42 | 145 | 41 | 10 | 7 | 250 | 22.76 | 15.07 | 2.22 | 1.51 | 485.87 | 23.40 |
| 23 | 1.91 | 0.45 | 146 | traces | traces | 5 | 300 | 19.48 | 12.06 | 0.03 | 1.61 | 487.35 | 22.24 |
| 24 | 1.89 | 0.42 | 147 | traces | traces | 2 | 450 | 21.25 | 13.49 | 0.10 | 1.57 | 486.87 | 23.86 |
| 25 | 1.21 | 0.34 | 148 | 26 | traces | 34 | 200 | 22.01 | 16.72 | 0.17 | 1.31 | 489.51 | 11.67 |
| 26 | 1.34 | 0.38 | 175 | 23 | traces | 36 | 150 | 17.62 | 13.10 | 0.45 | 1.34 | 488.64 | 10.39 |
| 27 | 1.35 | 0.34 | 176 | 22 | traces | 32 | 50 | 17.32 | 14.02 | 0.23 | 1.23 | 489.25 | 8.85 |
| 28 | 1.23 | 0.36 | 210 | traces | traces | 28 | 75 | 13.70 | 10.63 | 0.04 | 1.28 | 485.77 | 11.51 |
| 29 | 1.31 | 0.34 | 204 | traces | traces | 28 | 90 | 15.09 | 12.56 | 0.08 | 1.20 | 484.49 | 12.75 |
| 30 | 1.32 | 0.34 | 230 | 10 | traces | 8 | 60 | 20.11 | 14.59 | 0.01 | 1.37 | 483.25 | 28.35 |
| 31 | 1.50 | 0.32 | 195 | 12 | traces | 12 | 250 | 22.13 | 17.19 | 0.23 | 1.28 | 487.62 | 15.01 |
| 32 | 1.78 | 0.35 | 205 | traces | traces | 5 | 300 | 21.72 | 15.04 | 0.19 | 1.44 | 488.9 | 16.91 |
| 33 | 1.82 | 0.34 | 231 | traces | traces | 8 | 350 | 16.13 | 13.08 | 0.00 | 1.23 | 487.41 | 20.42 |
| 34 | 1.34 | 0.34 | 225 | traces | traces | 20 | 100 | 17.51 | 13.51 | 0.19 | 1.29 | 483.81 | 18.68 |
| 35 | 1.27 | 0.35 | 235 | traces | traces | 12 | 200 | 17.87 | 13.44 | 0.60 | 1.32 | 482.65 | 27.77 |
| 36 | 1.31 | 0.36 | 169 | 15 | 20 | 28 | 50 | 24.22 | 14.64 | 0.31 | 1.65 | 488.51 | 4.80 |
| 37 | 1.25 | 0.37 | 177 | traces | traces | 26 | 100 | 23.37 | 14.03 | 1.05 | 1.66 | 489.15 | 8.44 |
| 38 | 1.29 | 0.32 | 228 | traces | traces | 13 | 80 | 20.34 | 15.63 | 0.28 | 1.30 | 483.04 | 24.17 |
| 39 | 1.32 | 0.29 | 223 | traces | traces | 13 | 200 | 22.59 | 17.69 | 0.14 | 1.27 | 483.48 | 21.52 |

TABLE IIb

| ex. No. | $Fe_2O_3$ (%) | FeO (%) | Co (ppm) | $Cr_2O_3$ (ppm) | $V_2O_5$ (ppm) | $CeO_2$ (%) | $MnO_2$ (ppm) | TLA4 (%) | TE4 (%) | TUV4 (%) | SE4 | $\lambda_D$ (nm) | P (%) |
|---|---|---|---|---|---|---|---|---|---|---|---|---|---|
| 40 | 1.20 | 0.37 | 52 | traces | traces | 0.047 | 300 | 47.47 | 25.84 | 8.65 | 1.83 | 489.46 | 15.29 |
| 41 | 1.15 | 0.35 | 65 | 38 | 29 | 0.239 | 250 | 44.35 | 25.18 | 7.40 | 1.76 | 488.84 | 16.57 |
| 42 | 1.71 | 0.45 | 128 | 27 | traces | 0.482 | 150 | 24.73 | 13.83 | 1.80 | 1.78 | 489.65 | 19.52 |
| 43 | 1.45 | 0.39 | 112 | 38 | traces | 0.244 | 100 | 33.63 | 20.72 | 5.60 | 1.62 | 488.37 | 19.27 |
| 44 | 1.83 | 0.38 | 145 | 40 | 50 | 0.245 | 50 | 26.65 | 16.82 | 1.34 | 1.58 | 489.12 | 19.46 |
| 45 | 1.21 | 0.29 | 75 | traces | traces | 0.243 | 100 | 46.03 | 29.14 | 6.54 | 1.57 | 488.28 | 15.08 |

TABLE IIc

| ex. No. | Fe$_2$O$_3$ (%) | FeO (%) | Co (ppm) | V$_2$O$_5$ (ppm) | Cr$_2$O$_3$ (ppm) | Se(ppm) | TiO$_2$ (%) | MnO$_2$ (ppm) | TLA4 (%) | TE4 (%) | TUV4 (%) | SE4 | $\lambda_D$ (nm) | P (%) |
|---|---|---|---|---|---|---|---|---|---|---|---|---|---|---|
| 46 | 1.49 | 0.37 | 211 | traces | traces | 8 | 1.03 | 100 | 16.30 | 13.05 | 0.00 | 1.24 | 485.11 | 24.60 |
| 47 | 1.35 | 0.29 | 195 | traces | traces | 5 | 0.95 | 250 | 25.13 | 20.08 | 1.37 | 1.25 | 484.88 | 23.00 |
| 48 | 1.52 | 0.32 | 175 | traces | traces | traces | 1.12 | 50 | 27.18 | 18.70 | 0.31 | 1.45 | 487.10 | 21.40 |

TABLE IId

| ex. No. | Fe$_2$O$_3$ (%) | FeO (%) | Co (ppm) | Cr$_2$O$_3$ (ppm) | V$_2$O$_5$ (ppm) | MnO$_2$ (ppm) | TLA4 (%) | TE4 (%) | TUV4 (%) | SE4 | $\lambda_D$ (nm) | P (%) |
|---|---|---|---|---|---|---|---|---|---|---|---|---|
| 49 | 1.26 | 0.33 | 67 | 77 | 7 | 100 | 42.70 | 25.47 | 7.60 | 1.67 | 488.90 | 16.84 |
| 50 | 1.44 | 0.32 | 92 | 5 | 410 | 200 | 37.17 | 23.47 | 3.70 | 1.58 | 489.20 | 16.81 |
| 51 | 1.27 | 0.31 | 78 | 89 | 312 | 300 | 40.69 | 25.57 | 6.10 | 1.59 | 489.20 | 16.59 |
| 52 | 1.29 | 0.31 | 67 | 74 | 7 | 400 | 43.43 | 26.77 | 7.20 | 1.62 | 489.20 | 15.78 |
| 53 | 1.28 | 0.32 | 67 | 81 | 7 | 250 | 42.91 | 25.97 | 7.20 | 1.65 | 489.20 | 16.22 |
| 54 | 1.28 | 0.29 | 68 | 77 | 7 | 100 | 43.64 | 27.27 | 7.00 | 1.59 | 489.40 | 15.37 |
| 55 | 1.28 | 0.32 | 67 | 79 | 7 | 50 | 43.17 | 26.17 | 7.10 | 1.64 | 489.40 | 15.79 |
| 56 | 1.27 | 0.32 | 60 | 81 | 7 | 50 | 43.37 | 26.07 | 7.00 | 1.66 | 489.40 | 15.87 |
| 57 | 1.27 | 0.30 | 76 | 102 | 326 | 75 | 41.05 | 25.77 | 6.00 | 1.59 | 489.70 | 15.99 |
| 58 | 1.15 | 0.35 | 70 | 10 | 50 | 100 | 42.66 | 24.78 | 8.30 | 1.72 | 486.17 | 20.73 |
| 59 | 1.16 | 0.38 | 50 | traces | traces | 200 | 44.83 | 24.00 | 8.49 | 1.86 | 487.46 | 18.47 |
| 60 | 1.15 | 0.37 | 27 | traces | 15 | 250 | 49.55 | 26.06 | 8.60 | 1.90 | 490.04 | 14.03 |
| 61 | 1.20 | 0.37 | 51 | traces | 22 | 100 | 44.95 | 24.73 | 8.32 | 1.81 | 488.48 | 16.73 |
| 62 | 1.12 | 0.42 | 18 | 15 | traces | 50 | 47.79 | 22.67 | 9.61 | 2.10 | 490.70 | 14.50 |
| 63 | 1.14 | 0.41 | 36 | traces | traces | 75 | 45.42 | 22.62 | 9.27 | 2.00 | 488.80 | 17.11 |
| 64 | 1.12 | 0.42 | 44 | traces | traces | 100 | 43.32 | 21.28 | 9.50 | 2.03 | 487.72 | 19.43 |
| 65 | 1.12 | 0.36 | 52 | traces | traces | 300 | 45.50 | 25.27 | 9.19 | 1.80 | 487.48 | 18.07 |
| 66 | 1.14 | 0.32 | 68 | traces | traces | 250 | 44.95 | 27.28 | 8.70 | 1.64 | 486.58 | 18.68 |
| 67 | 1.401 | 0.36 | 70 | 5 | 100 | 100 | 40.78 | 23.63 | 5.39 | 1.72 | 489.49 | 15.91 |
| 68 | 1.45 | 0.47 | 80 | 96 | 12 | 100 | 32.30 | 15.63 | 5.33 | 2.06 | 489.23 | 20.36 |
| 69 | 1.42 | 0.34 | 95 | 23 | 92 | 50 | 36.79 | 23.02 | 5.01 | 1.59 | 487.65 | 19.22 |
| 70 | 1.51 | 0.36 | 65 | traces | 15 | 100 | 35.54 | 21.48 | 3.12 | 1.65 | 488.43 | 18.25 |
| 71 | 1.48 | 0.37 | 55 | 32 | traces | 50 | 36.75 | 21.62 | 3.62 | 1.69 | 489.52 | 17.12 |
| 72 | 1.55 | 0.49 | 50 | traces | traces | 75 | 33.09 | 16.90 | 3.38 | 1.95 | 489.12 | 19.89 |
| 73 | 1.40 | 0.49 | 27 | traces | traces | 150 | 37.53 | 18.53 | 4.79 | 2.02 | 489.44 | 18.90 |
| 74 | 1.40 | 0.40 | 95 | traces | traces | 200 | 35.46 | 20.84 | 4.38 | 1.70 | 485.81 | 23.57 |
| 75 | 1.39 | 0.38 | 102 | traces | traces | 250 | 35.57 | 21.52 | 4.45 | 1.65 | 485.26 | 24.11 |
| 76 | 1.55 | 0.36 | 80 | 10 | 25 | 100 | 37.19 | 21.94 | 3.04 | 1.69 | 489.61 | 16.28 |
| 77 | 1.61 | 0.38 | 125 | 31 | 28 | 50 | 29.31 | 18.56 | 2.45 | 1.57 | 486.34 | 23.86 |
| 78 | 1.78 | 0.44 | 116 | traces | 98 | 100 | 26.82 | 15.42 | 1.06 | 1.73 | 488.15 | 21.63 |
| 79 | 1.69 | 0.34 | 137 | 31 | traces | 150 | 27.91 | 18.74 | 1.67 | 1.48 | 486.30 | 23.49 |
| 80 | 1.75 | 0.31 | 165 | 17 | 36 | 50 | 24.05 | 17.93 | 0.85 | 1.34 | 484.95 | 26.81 |
| 81 | 1.27 | 0.42 | 74 | traces | traces | 75 | 38.90 | 22.20 | 8.25 | 1.75 | 485.80 | 22.90 |
| 82 | 1.24 | 0.44 | 81 | traces | traces | 100 | 36.94 | 20.86 | 7.75 | 1.77 | 485.50 | 24.33 |
| 83 | 1.27 | 0.39 | 71 | traces | traces | 150 | 40.72 | 23.55 | 8.18 | 1.73 | 486.40 | 20.87 |
| 84 | 1.29 | 0.33 | 90 | traces | 25 | 1000 | 36.18 | 23.50 | 6.44 | 1.54 | 489.52 | 11.28 |
| 85 | 1.35 | 0.45 | 81 | 15 | traces | 1250 | 33.60 | 17.15 | 6.37 | 1.96 | 488.72 | 16.35 |
| 86 | 1.15 | 0.34 | 161 | 18 | 21 | 789 | 24.76 | 19.63 | 54.99 | 1.26 | 486.47 | 14.01 |
| 87 | 1.51 | 0.35 | 244 | traces | traces | 1200 | 20.00 | 15.63 | 2.73 | 1.28 | 480.76 | 31.63 |
| 88 | 1.41 | 0.40 | 98 | traces | 225 | 1250 | 34.05 | 20.19 | 3.38 | 1.69 | 487.38 | 20.77 |

The invention claimed is:

1. A colored soda-lime glass of blue hue composed of glass-forming main constituents, comprising more than 2% of magnesium oxide and coloring agents, characterized in that it contains
   (a) 1.2 wt % or more of Fe$_2$O$_3$;
   (b) less than 0.53 wt % FeO; and
   (c) less than 0.13 wt % manganese oxide;
and has
   (d) a light transmission (TLA4) of between 15% and 70%;
   (e) a selectivity (SE4) of greater than 1.2;
   (f) a dominant wavelength ($\lambda_D$) and an excitation purity (P) such that they lie in a CIE 1931 chromaticity plot within a triangle whose apices are defined by the point representing the Illuminant C source and the points whose coordinates ($\lambda_D$,P) are (490,19) and (476,49), respectively; and
   (g) a purity P of more than 12%.

2. The colored glass according to claim 1, having one or more of the following additional characteristics:
   (a) a dominant wavelength ($\lambda_D$) of less than 489 nm;
   (b) a TUV4 of less than 10%;
   (c) a redox value of less than 41%;
   (d) a selectivity (SE4) of greater than 1.6;
   (e) at least one coloring agent selected from the group consisting of Cr, Co, Se, Ce, V, Ti.

3. The colored glass according to claim 1 characterized in that it has a dominant wavelength ($\lambda_D$) and an excitation purity (P) such that they lie in a CIE 1931 chromaticity plot within a triangle whose apices are defined by the point representing the Illuminant C source and the points whose coordinates ($\lambda_D$,P) are (490,19) and (480,38), respectively.

4. The colored glass according to claim 1, characterized in that it comprises the following percentages by weight of coloring agents, the total amount of iron being expressed in the form of Fe$_2$O$_3$:

|   |   |
|---|---|
| Fe$_2$O$_3$ | 1.2 to 1.6%; |
| Co | 0.0030 to 0.0100%; |
| Cr$_2$O$_3$ | 0 to 0.0200%; |
| V$_2$O$_5$ | 0 to 0.0500%; |
| Se | 0 to 0.0020%; |
| CeO$_2$ | 0 to 0.5%; |
| TiO$_2$ | 0 to 1.5%. |

5. The colored glass according to claim 4, characterized in that it comprises the following percentages by wight of coloring agents, the total amount of iron being expressed in the form of Fe$_2$O$_3$:

|   |   |
|---|---|
| Fe$_2$O$_3$ | 1.2 to 1.5%; |
| FeO | 0.34 to 0.45%; |
| Co | 0.0030 to 0.0100%; |
| Cr$_2$O$_3$ | 0 to 0.0150%; |
| V$_2$O$_5$ | 0 to 0.0400%. |

6. The colored glass according to claim 4, characterized in that it has the following optical properties:

35%<TLA4<45%;

20%<TE4<30%;

TUV4<9%;

($\lambda_D$)>483 nm.

7. The colored glass according to claim 5, characterized in that it has the following optical properties:

35%<TLA4<45%;

20%<TE4<30%;

TUV4<9%;

$\lambda_D$>483 nm.

8. The colored glass according to claim 1, characterized in that it comprises the following percentages by weight of coloring agents, the total amount of iron being expressed in the form of Fe$_2$O$_3$:

|   |   |
|---|---|
| Fe$_2$O$_3$ | 1.3 to 1.8%; |
| FeO | 0.30 to 0.50%; |
| Co | 0.0160 to 0.0270%; |
| Cr$_2$O$_3$ | 0 to 0.0200%; |
| V$_2$O$_5$ | 0 to 0.0500%; |
| Se | 0 to 0.0040%; |
| CeO$_2$ | 0 to 0.5%. |

9. The colored glass according to claim 8, characterized in that it has the following optical properties:

16%<TLA4<24%;

12%<TE4<18%;

TUV4<5%;

476 nm<$\lambda_D$<483 nm;

P>18%.

10. A window for an automobile formed of colored glass according to claim 1.

\* \* \* \* \*